No. 757,353. PATENTED APR. 12, 1904.
E. W. SAYRE.
LAWN MOWER.
APPLICATION FILED JULY 9, 1903.
NO MODEL.

Witnesses:-
Herman E. Metius
Hamilton D. Turner

Inventor:-
Edward W. Sayre
by his Attorneys;
Howson & Howson

No. 757,353. Patented April 12, 1904.

UNITED STATES PATENT OFFICE.

EDWARD W. SAYRE, OF CAPE MAY, NEW JERSEY, ASSIGNOR TO HIMSELF, LOUIS C. SAYRE, AND THOMAS S. SAYRE, OF CAPE MAY, NEW JERSEY.

LAWN-MOWER.

SPECIFICATION forming part of Letters Patent No. 757,353, dated April 12, 1904.

Application filed July 9, 1903. Serial No. 164,818. (No model.)

*To all whom it may concern:*

Be it known that I, EDWARD W. SAYRE, a citizen of the United States, and a resident of Cape May, New Jersey, have invented certain Improvements in Lawn-Mowers, of which the following is a specification.

The object of my invention is to improve the cutting action of a lawn-mower, an object which I attain by substituting a rotating cutting-blade for the fixed blade which usually coöperates with the blades of the rotating reel.

Figure 1:
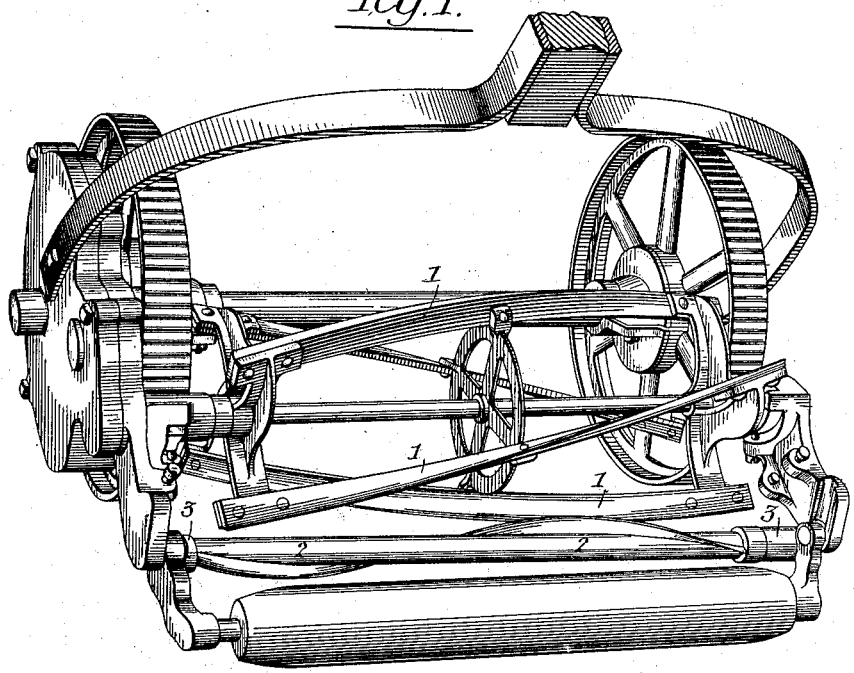
Figure 2:
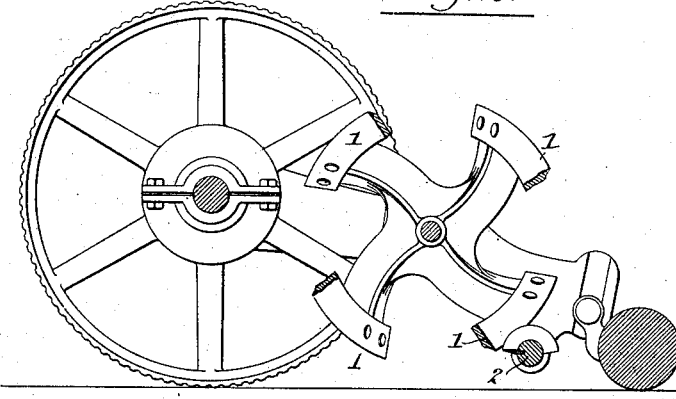

In the accompanying drawings, Figure 1 is a perspective view of an ordinary type of lawn-mower with my improved cutter attached thereto, and Fig. 2 is a longitudinal section of part of the same.

In its general construction the lawn-mower may be similar to any of those in common use which have a rotating reel with cutting-blades 1 and mechanism for rotating said reel, my invention having no reference to the general construction of the mower, but consisting in substituting a rotating cutter 2 for the usual fixed cutter which coacts with the blades of the reel to effect the cutting of the grass. As shown in the drawings, this rotating cutter 2 is mounted at each end so as to rotate in the bosses 3, which usually carry the ends of the fixed blade, and said cutter is rotated by contact of the spiral cutting-blade of the same with the successive blades of the reel, although it may, if desired, be positively driven by gearing from the traction-wheel of the mower, so as to rotate either in the same direction as the reel or in an opposite direction.

By the use of a rotating cutter in connection with a rotating reel in the manner described the cutting action is superior to that of an ordinary lawn-mower having a fixed cutting-blade.

The rotating cutter 2 may consist of a shaft or spindle having a cutting-blade inserted therein, as shown in Fig. 2, or said cutter may be forged or otherwise formed in one piece, if desired.

Having thus described my invention, I claim and desire to secure by Letters Patent—

1. A lawn-mower having a rotating reel with cutting-blades thereon and a rotating cutter coacting with the cutting-blades of said reel, substantially as specified.

2. A lawn-mower having a rotating reel with cutting-blades thereon and a rotating cutter with spirally-disposed cutting-blades coacting with the successive cutting-blades of the reel, substantially as specified.

3. A lawn-mower having a rotating reel and a rotating cutter coacting with the successive blades of the reel and rotated by contact therewith, substantially as specified.

In testimony whereof I have signed my name to this specification in the presence of two subscribing witnesses.

EDWARD W. SAYRE.

Witnesses:
LEWIS T. STEVENS,
F. W. CASSEDY.